(12) United States Patent
Bespalov et al.

(10) Patent No.: US 8,972,192 B2
(45) Date of Patent: Mar. 3, 2015

(54) ESTIMATION OF ACTUAL CONDITIONS OF A ROADWAY SEGMENT BY WEIGHTING ROADWAY CONDITION DATA WITH THE QUALITY OF THE ROADWAY CONDITION DATA

(75) Inventors: Dmitriy Bespalov, Philadelphia, PA (US); James F. Carroll, Gilbertsville, PA (US); Dean Zimmerman, Lititz, PA (US)

(73) Assignee: HERE Global B.V., Veldhoven (NL)

( * ) Notice: Subject to any disclaimer, the term of this patent is extended or adjusted under 35 U.S.C. 154(b) by 1811 days.

(21) Appl. No.: 11/860,918

(22) Filed: Sep. 25, 2007

(65) Prior Publication Data

US 2009/0080973 A1    Mar. 26, 2009

(51) Int. Cl.
*G01V 15/00* (2006.01)
*G08G 1/01* (2006.01)

(52) U.S. Cl.
CPC .................................... *G08G 1/0104* (2013.01)
USPC ........................................................... 702/2

(58) Field of Classification Search
USPC ............ 702/2, 5, 81, 84; 701/117; 340/995.1, 340/995.13
See application file for complete search history.

(56) References Cited

U.S. PATENT DOCUMENTS

| | | | | |
|---|---|---|---|---|
| 5,173,691 A | * | 12/1992 | Sumner | 340/905 |
| 6,317,686 B1 | * | 11/2001 | Ran | 701/210 |
| 6,842,620 B2 | | 1/2005 | Smith et al. | |
| 6,879,907 B2 | | 4/2005 | Feldman et al. | |
| 6,989,765 B2 | | 1/2006 | Gueziec | |
| 7,096,115 B1 | | 8/2006 | Groth et al. | |
| 7,418,346 B2 | * | 8/2008 | Breed et al. | 701/301 |
| 7,590,488 B2 | * | 9/2009 | Tu | 701/209 |
| 7,605,720 B1 | * | 10/2009 | Menzies et al. | 340/995.13 |
| 2006/0158330 A1 | * | 7/2006 | Gueziec | 340/539.13 |
| 2006/0161334 A1 | * | 7/2006 | Teramae | 701/117 |

* cited by examiner

*Primary Examiner* — Elias Desta
(74) *Attorney, Agent, or Firm* — Lempia Summerfield Katz LLC

(57) ABSTRACT

Actual conditions of a roadway segment are estimated by providing roadway condition data to a processor for the roadway segment from a plurality of different types of sources of the roadway condition data, assigning a quality to each of the plurality of different types of sources of the roadway condition data, and estimating in the processor the actual conditions of the roadway segment by using the roadway condition data and the quality of each of the plurality of different types of sources of the roadway data. The quality determines weightings given to each of the plurality of different types of sources.

20 Claims, 10 Drawing Sheets

Real-Time Component of $S(x,t)$

Congestion Sub-Component, Incident Component of $S(x,t)$

Non-Congestion Sub-Component, Incident Component of $S(x,t)$

Real-Time Component of $w_{qf}(x,t)$

Congestion Sub-Component, Incident Component of $w_{qf}(x,t)$

Non-Congestion Sub-Component, Incident Component of $w_{qf}(x,t)$

US 8,972,192 B2

ESTIMATION OF ACTUAL CONDITIONS OF A ROADWAY SEGMENT BY WEIGHTING ROADWAY CONDITION DATA WITH THE QUALITY OF THE ROADWAY CONDITION DATA

BACKGROUND OF THE INVENTION

Many techniques exist today to estimate actual conditions of roadway segments. Road sensors are the most common technique used today. Other more recently developed techniques include extracting location data from banks of cell phones traveling along a roadway segment and using toll tag data. Historical data may also be used if no actual data is available. The quality of these various data sources vary dramatically. Also, for real-time data sources, the quality varies temporally. Current techniques do not adequately take into account such quality issues when determining and reporting estimated actual roadway conditions. The disclosed system and method address this deficiency.

BRIEF SUMMARY OF THE INVENTION

In one preferred embodiment, actual conditions of a roadway segment are estimated by providing roadway condition data to a processor for the roadway segment from a plurality of different types of sources of the roadway condition data, assigning a quality to each of the plurality of different types of sources of the roadway condition data, and estimating in the processor the actual conditions of the roadway segment by using the roadway condition data and the quality of each of the plurality of different types of sources of the roadway data. The quality determines weightings given to each of the plurality of different types of sources.

In another preferred embodiment, a quality factor of an estimation of actual roadway conditions of a roadway segment is determined by providing roadway condition data to a processor for the roadway segment from one or more different sources of roadway condition data, calculating in the processor an estimation of actual roadway conditions of the roadway segment from the roadway condition data, assigning a quality for each of the plurality of different sources of roadway condition data, and determining in the processor a quality factor of the estimation of actual roadway conditions of the roadway segment by using the quality for each of the plurality of different sources.

BRIEF DESCRIPTION OF THE DRAWINGS

The foregoing summary, as well as the following detailed description of preferred embodiments, will be better understood when read in conjunction with the appended drawings. For the purpose of illustration, the drawings show presently preferred embodiments. However, the invention is not limited to the precise arrangements and instrumentalities shown.

In the drawings.

DETAILED DESCRIPTION OF THE INVENTION

I. Overview of a Present Embodiment

Figure 1:
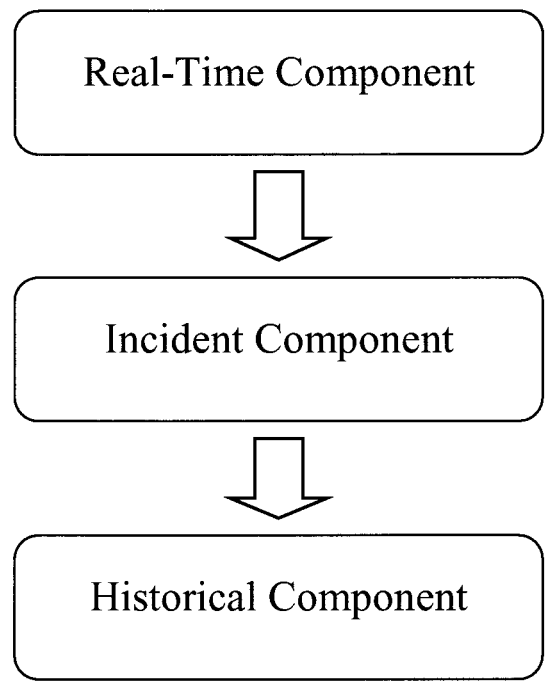
FIGS. 1-3 show hierarchies of components and subcomponents in accordance with preferred embodiments.

A method and apparatus are provided for estimating actual conditions of a roadway segment, and operates as follows:

1. Roadway condition data (interchangeably referred to hereafter as "RCD") is provided to a processor for the roadway segment from a plurality of different types of sources of the roadway condition data. The sources of data may be fixed sources that are always present in the roadway segment (e.g., road sensors), or "potential" sources such as a probe (e.g., cell phone GPS data from a floating car) or a toll tag, which are not always present in the roadway segment, but may happen to travel through the roadway segment.

2. A "quality" is assigned to each of the plurality of different types of sources of the roadway condition data.

3. The processor estimates the actual conditions of the roadway segment by using the roadway condition data and the quality of each of the plurality of different types of sources of the roadway data. The quality determines weightings given to each of the plurality of different types of sources. If there are no data points for a particular type of source, then the weighting becomes zero.

There are a plurality of data points (interchangeably referred to hereafter as "slices") along the roadway segment, and the estimating is preferably performed for each of the data points. Also, the plurality of different types of sources are preferably defined by a hierarchy that defines which type of source is used for the estimating step when data from the source is available. The estimating is then performed for each of the data points by using roadway condition data from only the type of source defined by the hierarchy. That is, if the first type of source in the hierarchy exists, then that type of source is used exclusively. If the first type of source does not exist, but the second type of source exists, then that type of source is used exclusively, and so on. In one preferred embodiment, the hierarchy has three levels with the following order: (i) real-time roadway condition data, (ii) roadway incident data, and (iii) historical roadway condition data.

In preferred embodiments, the plurality of different types of sources of the roadway condition data include at least two of the following different types of sources: (i) real-time roadway condition data, (ii) roadway incident data, (iii) historical roadway condition data, and (iv) speed limit data. Also, there may be multiple sources for at least one of the different types of sources of the roadway condition data. For example, if the type of source is a real-time source, such as a roadway sensor or GPS data from a cell phone, data from multiple cell phones may be used, or data from one cell phone and one roadway sensor may be used. If the type of source is roadway incident data, data from two different incidents may be used, such as an accident and construction. The real-time condition data at data points that have multiple sources of real-time condition data are weighted based on the quality of the respective source. For example, if the two data sources are two cell phones, each one will have a different quality at a particular data point, so they are weighted accordingly.

For each data point along the roadway segment, an instantaneous speed may be calculated at each of the data points from one or more of the different multiple sources of roadway condition data and their respective quality. The instantaneous speed at each of the data points may then be used to estimate the actual conditions of the roadway segment. The actual conditions may include total time to travel through the roadway segment and average speed along the roadway segment.

Figure 4:
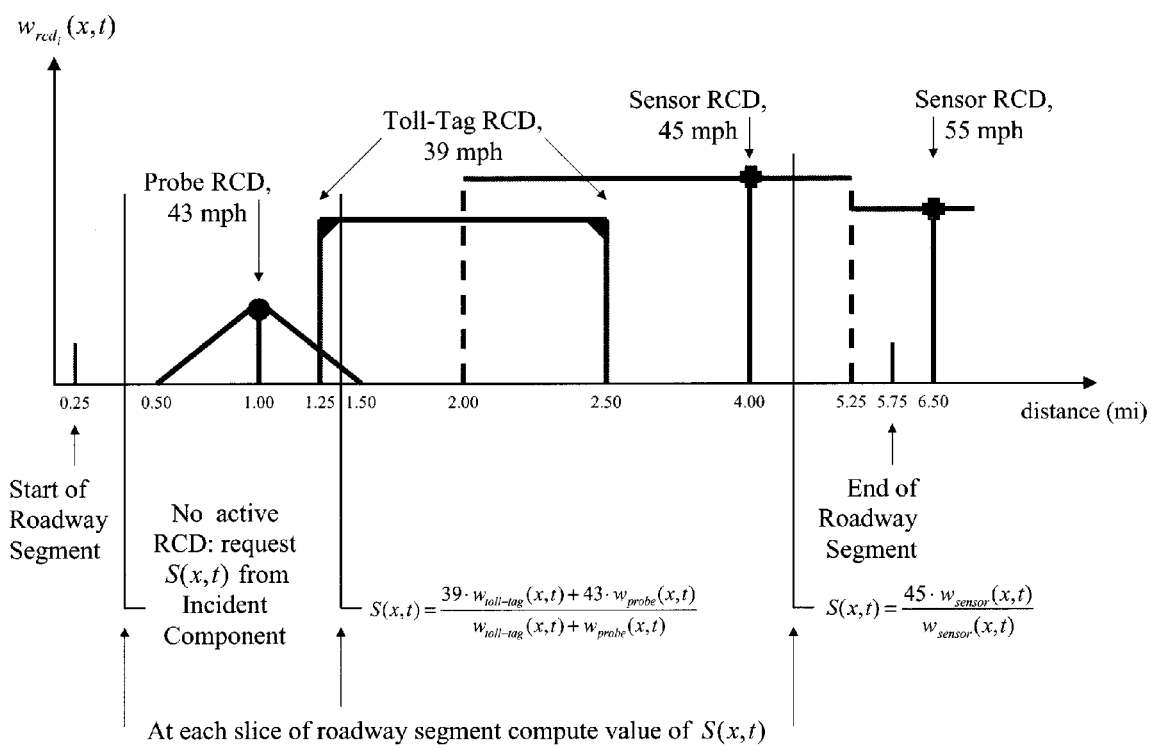
FIGS. 4-9 show sample layout of roadway condition data in accordance with preferred embodiments.
Figure 5:
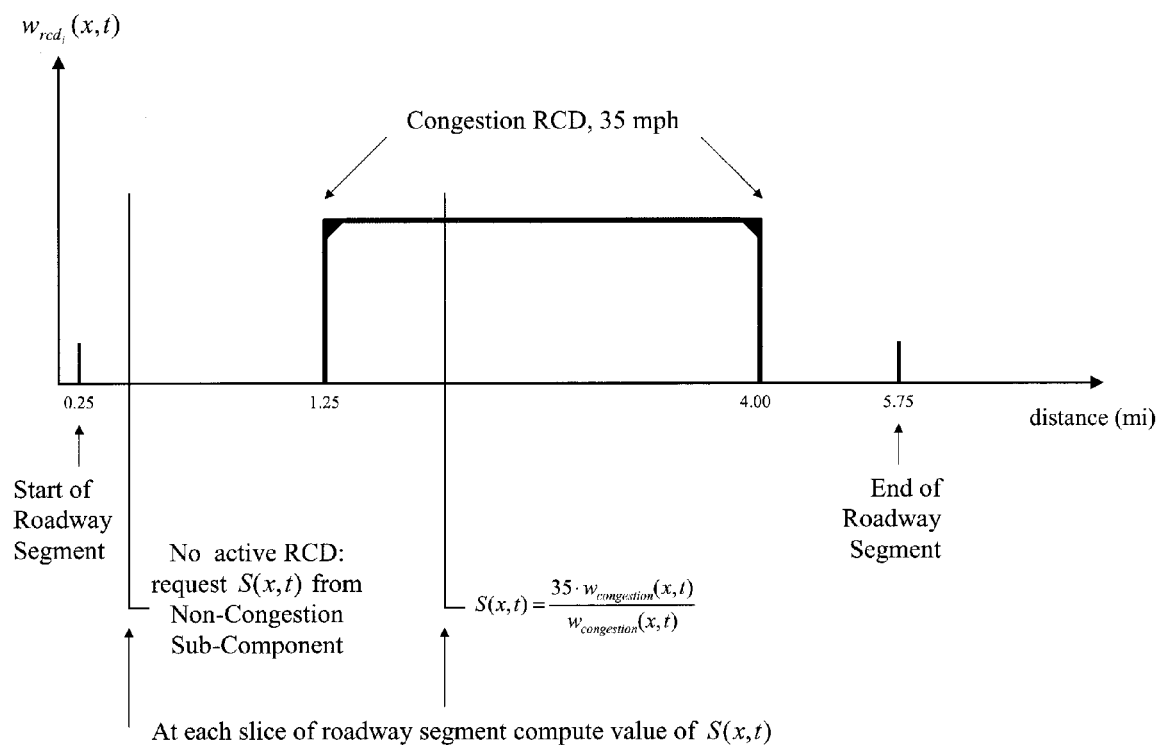
Figure 6:
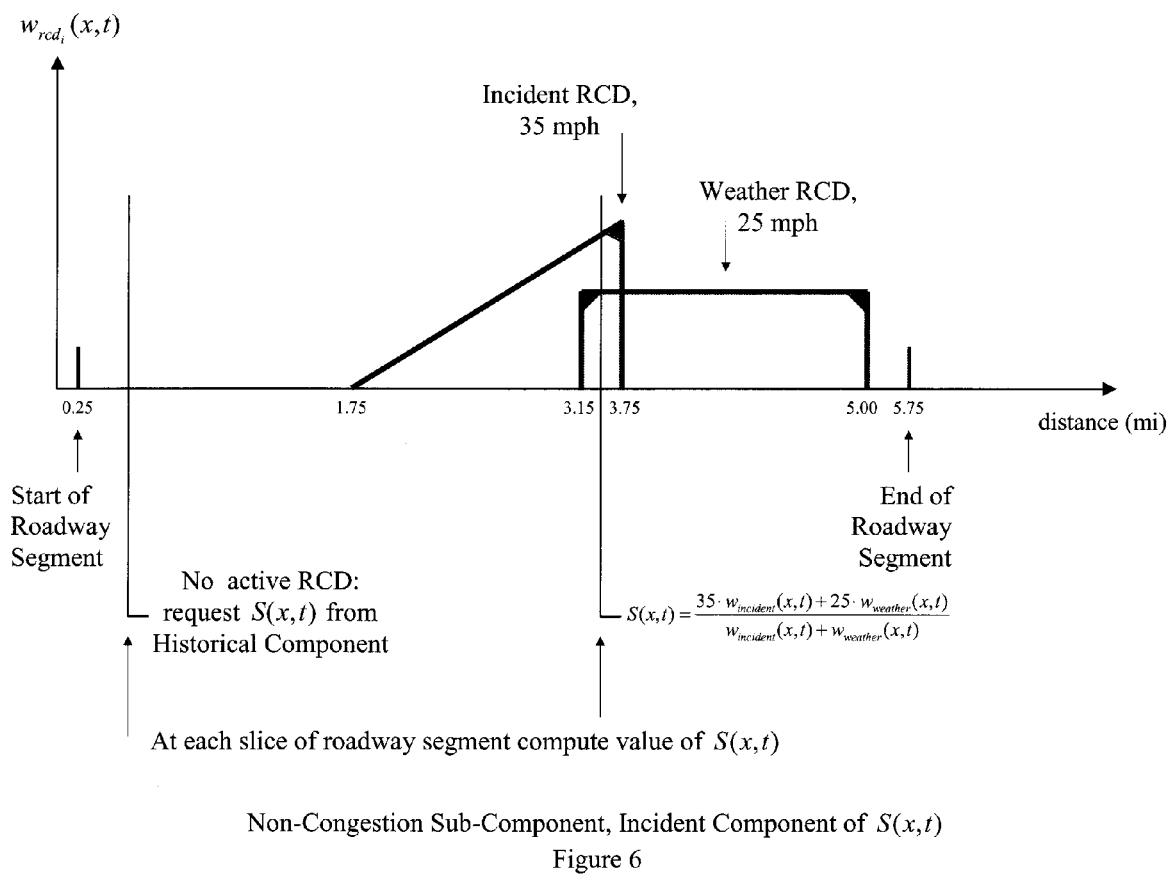
Figure 7:
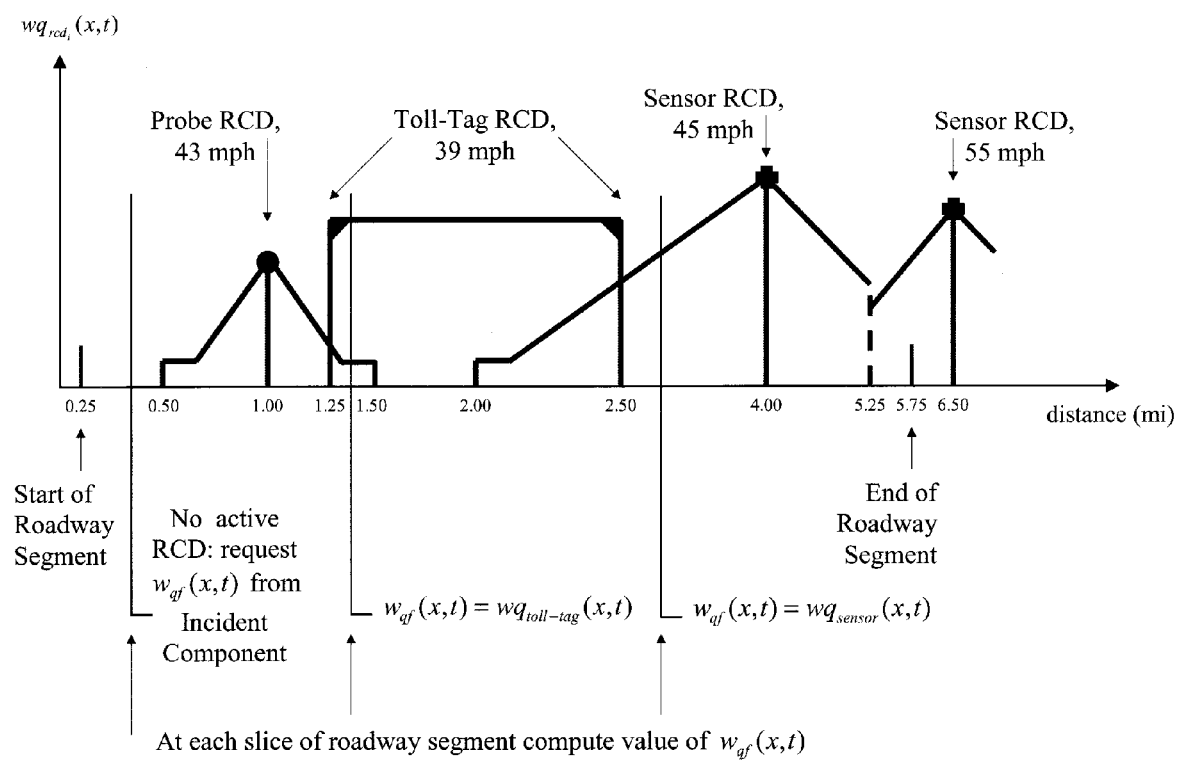
Figure 8:
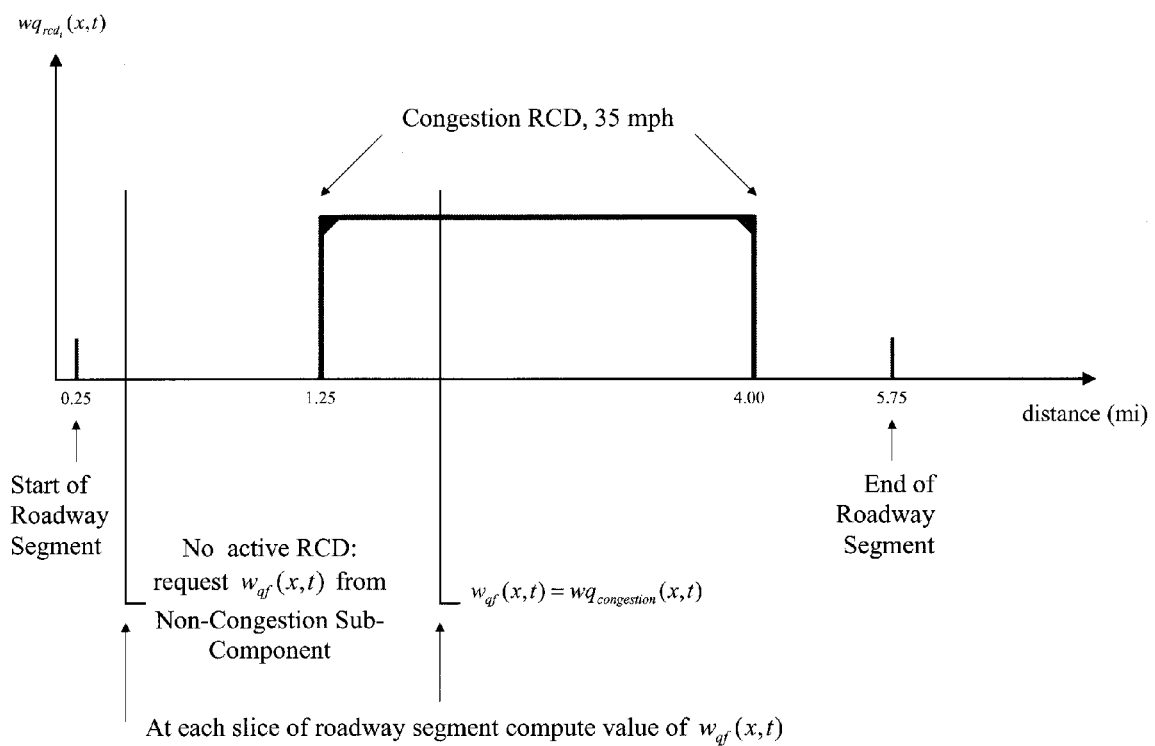
Figure 9:
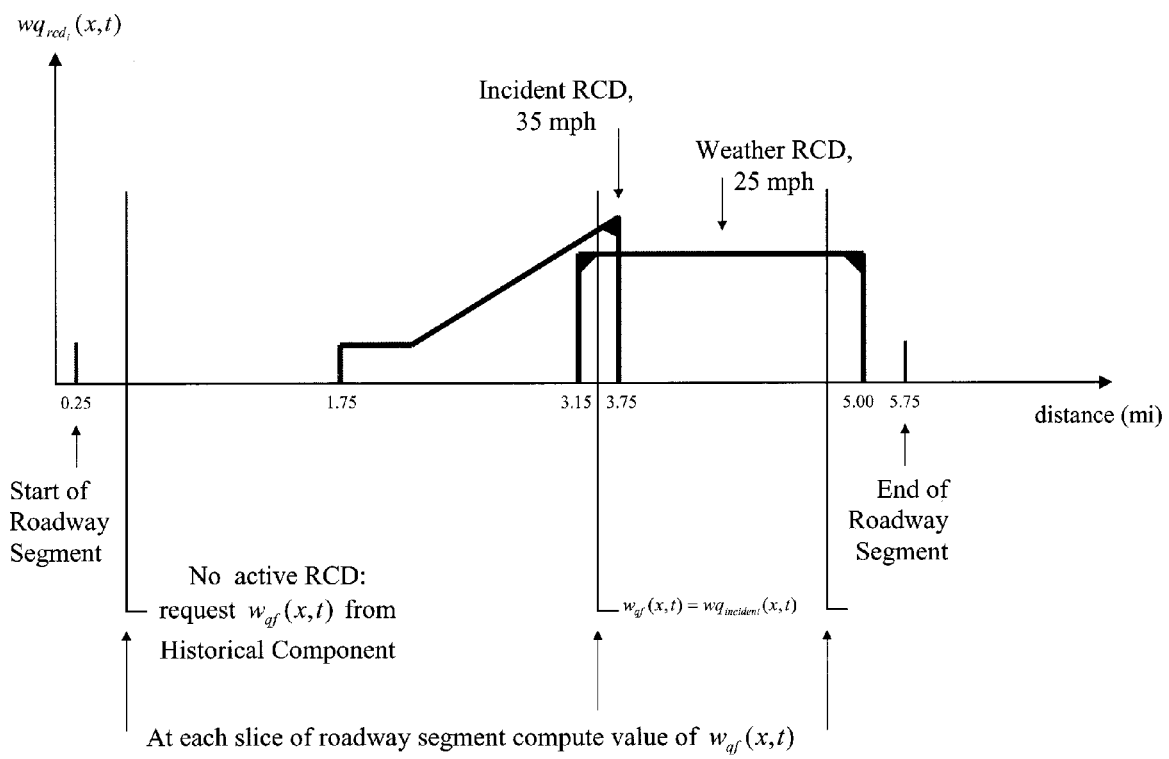

Each type of source of roadway condition data has its own "quality profile" that varies over distance along the roadway segment. FIGS. 4-6 show profiles of weights that are used to produce an estimation of the actual roadway conditions, whereas FIGS. 7-9 show profiles of quality weights that are used in the process of calculating a quality factor for the corresponding process of estimation of roadway conditions. That is, there are two separate computations (processes) involved in the Hierarchical Travel Time Model (HTTM)

described herein, namely, the process of estimating actual roadway conditions (FIGS. 4-6), and the process of calculating a quality factor for the corresponding process of estimation of actual roadway conditions (FIGS. 7-9).

A method and apparatus are also provided for determining a quality factor of an estimation of actual roadway conditions of a roadway segment, and operates as follows:

1. Roadway condition data is provided to a processor for the roadway segment from one or more different sources of roadway condition data.
2. The processor calculates an estimation of actual roadway conditions of the roadway segment from the roadway condition data.
3. A quality is assigned for each of the plurality of different sources of roadway condition data. The quality is a mathematical function.
4. The processor determines a quality factor of the estimation of actual roadway conditions of the roadway segment by using the quality for each of the plurality of different sources. The quality determines weightings given to each of the different sources of roadway condition data.

There are a plurality of data points or slices along the roadway segment. In one preferred embodiment, a quality factor is calculated for each of the data points along the roadway segment and then the quality factors for each of the data points are aggregated to obtain the quality factor of the estimation of actual roadway conditions of the roadway segment. Each type of source of roadway condition data has its own quality profile that varies over distance along the roadway segment.

II. Detailed Disclosure

A variety of roadway sensors and vehicle probes are used to determine the time of travel across a plurality of roadway segments. Conventional approaches are known to use a single method of determining the time of travel estimate. These approaches typically require a homogenous environment and work only under certain conditions. Accordingly, they tend to create significant gaps of knowledge and coverage to end users and applications. The approach taken in the present method for performing a travel time estimation takes into account all available forms or roadway condition data (RCD) and determines highly granular and flexible combination of this data for a consistent and robust method of time of travel estimation. The present method incorporates the following forms of data in a hierarchical manner to perform its estimations:

1. Roadway sensors which deliver volume and/or speed information of which there are numerous types, including roadway loops, microwave, acoustic, laser, video and other devices which can make this determination and deliver the corresponding data to systems.
2. Toll tag readers which are a form of fixed location probes which provide a travel time across a plurality of links of a roadway from a subset of the vehicles traveling past them.
3. Floating car probe data which tracks individual vehicles along a plurality of segments of a roadway. The vehicle's current and previous position with a corresponding speed may be used to determine the effective RCD.
4. Historical RCD data where a prediction can be made in lieu of actual live RCD data.
5. Incident data which is a combination of accidents, construction, events and other planned or unplanned events which effect roadway conditions.
6. Congestion data that reflects delays of various forms and types which are typically across a plurality of segments along a roadway.
7. Other factors which affect roadway conditions, including, but not limited to, weather, holidays, which may affect roadway conditions.

This robust set of data creates a unique ability to estimate time of travel by combining the data in a hierarchical form. The data is either combined together with similar data, or data which is considered superior at estimating the time of travel may supersede other data. This is determined in a continuous fashion, tracking which form of data used and its reliability of the data in estimating a time of travel, such that an effective confidence attribute is defined to provide insight into the value and overall expectation of the estimation.

This method improves upon single data source methods because it draws on all known possible sources of information and creates the best estimate in a continuous fashion across a plurality of roadway segments.

Availability of various types of roadway condition data (RCD) pose a problem of integrating them into one method that would make use of these various types of RCD to produce an accurate estimation of the actual roadway condition on a roadway segment, as well as a quality factor of the estimation. A Hierarchical Travel Time Model (HTTM) described herein is a computer implemented method that uses RCD from one or more sources to calculate in the processor an estimation of actual roadway conditions of the roadway segment; and uses the attributes representing the quality of RCD to determine in a processor a quality factor of the estimation of the actual roadway conditions of the roadway segment.

The following words and phrases, as used throughout the description of the present invention, are to be assigned the following meanings:

Quality of roadway condition data: The following factors determine the quality of RCD:
1. Time: interval between the time roadway condition data was recorded and time of estimation of roadway condition (how long ago was data obtained)
2. Position:
   a. Where are the sensors relative to the segment being measured
   b. How many are there, how well do they cover the segment
3. Type: is it historical, fixed sensor, probe, type of sensor, etc
4. Correlation between roadway condition data Roadway Condition Data (RCD): RCD includes the following types of data:
1. Historical/Speed Limit RCD
2. Traffic Event RCD
3. Sensor RCD (fixed position sensors)
4. Probe RCD (floating car)—GPS or cell phone
5. Sequence of probes RCD (combination of two probe points from the same source)
6. Toll tag RCD (combination of two toll tag readers that enable calculation of average time for vehicles equipped with toll tags to travel between two readers)

Traffic Event An occurrence on the road system which may have an impact on the flow of traffic. Traffic events include congestions, incidents, weather, construction and mass transit.

Congestion: A traffic event which represents a congestion of various degrees of severity. Congestion event is usually manually identified by traffic operators and spans across a stretch of some roadway.

Incident: A traffic event which is generally caused by an event, planned or unplanned, which directly or indirectly obstructs the flow of traffic on the road system or is otherwise noteworthy in reference to traffic. Incidents are generally locatable at a specific point or across a span of points. Some examples of incidents include: accidents, congestion, disabled vehicles, debris on the roadway, traffic light malfunction, and vehicle fires among others.

Weather: A Traffic Event which describes various weather conditions which can have a traffic impact and can be oriented directly on a plurality of segments or across a region. Some examples include: icy roads, rain, sun glare, etc.

Construction: A Traffic Event which includes planned and unplanned roadworks. This can be due to major construction, for example: adding a lane, bridgeworks, etc, or "roving" construction crews, for example, litter cleanup, pothole patching, line painting, etc.

Mass Transit: A Traffic Event which describes conditions on buses, trains, trolleys, airports, or other forms of non passenger vehicle transit. Examples include: service delays on one or more routes, service cancellations on one or more routes, etc I. Method for Estimating Roadway Conditions on a Roadway Segment A roadway segment is defined by $x_{start}$ and $x_{stop}$ positions in terms of distance from a pre-defined beginning of the roadway, which the roadway segment belongs to. Then, the formula for time that is required to travel through roadway segment $(x_{start}, x_{stop})$ at time t has a form:

$$TT(x_{start}, x_{stop}, t) = \int_{x_{start}}^{x_{stop}} \frac{1}{S(x, t)} dx \qquad \text{(Equation 1)}$$

where function $S(x,t)$ returns instantaneous speed values of traffic flow at position x and time t.

Integration required for travel time calculation may be performed symbolically. However, due to the complex nature of instantaneous speed function $S(x,t)$, a numerical approximation method may be used instead in the calculation. The so-called Simpson's Rule method was chosen for the system's implementation due to its efficiency and approximation accuracy.

1.1 Modeling Instantaneous Speed Function $S(x,t)$

Instantaneous speed function $S(x,t)$ has a hierarchical structure of three components: Real-Time, Incident (comprised of two sub-components) and Historical components. FIG. 1 shows a hierarchy of the components in descending order by its superiority at estimating the time of travel. In other words, road condition data (RCD) for higher level components would supersede RCD for lower level components. Whenever RCD is not available for a higher level component, RCD from a lower level would be used in the process of estimating the time of travel.

Various types of RCD are organized by the components as follows:

1. Real-Time Component
   a. Sensor RCD
   b. Probe RCD
   c. Sequence of probe RCD
   d. Toll tag RCD
2. Incident Component
   a. Congestion Sub-Component
      (i) Congestion RCD
   b. Non-Congestion Sub-Component
      (i) Incident RCD
      (ii) Weather RCD
      (iii) Construction RCD
      (iv) Mass Transit RCD
3. Historical Component
   (i) Historical RCD
   (ii) Speed Limit RCD 1.1.1 Modeling Components of $S(x,t)$ Real-Time and Incident (both of its sub-components) components need to handle more than one RCD entry for a given roadway segment. For such components, function $S(x,t)$ is defined as a weighted sum of speed readings from RCD that belong to the same component active on roadway segment $(x_{start}, x_{stop})$ at time t. Let $\{active\_rcd\}$ denote a set of active RCD (from the same component) on roadway segment $(x_{start}, x_{stop})$, $rcd_i$ denotes one RCD from set $\{active\_rcd\}$, and $s_{rcd_i}$ denotes a speed value recorded by $rcd_i$, and $w_{rcd_i}(x,t)$ denotes a weight function for $rcd_i$ at position x and time t; then $S(x,t)$ is defined as follows:

$$S(x, t) = \frac{\sum_{rcd_i \in \{active\_rcd\}} w_{rcd_i}(x, t) \cdot s_{rcd_i}}{\sum_{rcd_i \in \{active\_rcd\}} w_{rcd_i}(x, t)} \qquad \text{(Equation 2)}$$

Modeling a component of $S(x,t)$ is now reduced to modeling weight function $w_{rcd_i}(x,t)$ for each type of RCD that belongs to that component. Intuitively, weight function $w_{rcd_i}(x,t)$ captures the effect of a speed reading from a certain type of RCD on overall estimated speed on roadway segment $(x_{start}, x_{stop})$. Weight function $w_{rcd_i}(x,t)$ is defined as following:

$$w_{rcd_i}(x,t) = w_{dist}(x, w_{time}(t, w_{init})) \qquad \text{(Equation 3)}$$

$w_{init}$ denotes an initial weight parameter assigned for type of $rcd_i$, $w_{time}(t, w_{init})$ is a time weight function for type of $rcd_i$, $w_{dist}(x, w_{time}(t, w_{init}))$ is a position weight function for type of $rcd_i$ (time weight function $w_{time}(t, w_{init})$ becomes initial weight for distance weight function).

1.1.2 Modeling Real-Time Component of $S(x,t)$

The Real-Time component of instantaneous speed function $S(x,t)$ is modeled as described in Section 1.1.1. Methods for modeling weight function $w_{rcd_i}(x,t)$ for the types of RCD from Real-Time component are described below.

1.1.2.1 Modeling Time Weight Function for Sensor, Probe, Sequence of Probes, Toll Tag RCDs To define a time weight function for sensor, probe, sequence of probes, toll tag RCDs, let $t_0$ denote time of RCD reading, t denote time of roadway condition estimation, then $t-t_0$ is RCD age; $t_{lifetime}$ is the maximum age for one RCD reading, and $w_{init}$ is RCD's initial weight. The time weight function for RCD is defined by formula:

$$w_{time}(t, w_{init}) = \begin{cases} 0, t < t_0 \\ w_{init} \cdot \left(1 - \frac{t - t_0}{t_{lifetime}}\right), \\ 0, t > t_0 + t_{lifetime} \end{cases} \qquad \text{(Equation 4)}$$

$$t_0 \leq t \leq t_0 + t_{lifetime}$$

In the implementation of the system, the above parameters were set as follows:

$w_{init}=2.0$, for sensor RCD
$w_{init}=0.7$, for probe RCD
$w_{init}=1.0$, for sequence of probes RCD
$w_{init}=1.75$, for toll tag RCD
$t_{lifetime}=10$ minutes, for sensor, probe, sequence of probes and toll tag RCD
$t_0$ is a data field of real-time RCD entry

1.1.2.2. Modeling Position Weight Function for Sensor RCD

To define a position weight function for sensor RCD, let $x_0$ denote a position of the sensor, $d_p$ and $d_n$ denote distances from $x_0$ to previous and next sensors relative to the direction of the roadway correspondingly, x is the position of the sensor RCD weight calculation, $w_{time}$ is time weight for the sensor RCD (i.e., initial weight for distance weight function), $d_{max}$ is maximum active distance for sensor RCD. The weight function for sensor RCD is defined by formula:

$$w_{dist}(x, w_{time}) = \begin{cases} 0, x < x_0 - \min\left(d_{max}, \frac{d_p}{2}\right) \\ w_{time}, x_0 - \min\left(d_{max}, \frac{d_p}{2}\right) \le x \le x_0 + \min\left(d_{max}, \frac{d_n}{2}\right) \\ 0, x > x_0 + \min\left(d, \frac{d_n}{2}\right) \end{cases} \quad \text{(Equation 5)}$$

In the implementation of the system, the above parameters were set as follows:
$d_{max} = 2.0$ miles
$x_0$, $d_p$ and $d_n$ are data fields of sensor RCD entry

1.1.2.3. Modeling Position Weight Function for Probe RCD

To define a position weight function for probe RCD, let $x_0$ denote position of the probe, x is position of the probe RCD weight calculation, $w_{time}$ is time weight for the probe RCD (i.e., initial weight for distance weight function), $d_{max}$ is maximum active distance for probe RCD. A weight function for probe RCD is defined by formula:

$$w_{dist}(x, w_{time}) = \begin{cases} 0, x < x_0 - d_{max} \\ w_{time} \cdot \left(1 - \frac{|x_0 - x|}{d_{max}}\right), \\ 0, x > x_0 + d_{max} \end{cases} \quad \text{(Equation 6)}$$

$$x_0 - d_{max} \le x \le x_0 + d_{max}$$

In the implementation of the system, the above parameters were set as follows:
$d_{max} = 0.5$ miles
$x_0$ is data field of probe RCD entry

1.1.2.4 Modeling Position Weight Function for Sequence of Probes RCD

To define a position weight function for sequence of probes RCD, let $x_1$ denote position of the first probe RCD, $x_2$ denote position of the second probe RCD, x is position of the sequence of probes RCD weight calculation, $w_{time}$ is time weight for the RCD (i.e., initial weight for distance weight function). Weight function for probe RCD is defined by formula:

$$w_{dist}(x, w_{time}) = \begin{cases} 0, x < x_1 \\ w_{time}, x_1 \le x \le x_2 \\ 0, x > x_2 \end{cases} \quad \text{(Equation 7)}$$

$x_1$ and $x_2$ are data fields of sequence of probes RCD entry

1.1.2.5 Modeling Position Weight Function for Toll Tag RCD

To define a position weight function for toll tag RCD, let $x_1$ denote position of the first toll tag reader (start), $x_2$ denote position of the second toll tag reader (end), x is position of the toll tag RCD weight calculation, $w_{time}$ is time weight for the RCD (i.e., initial weight for distance weight function). Weight function for probe RCD is defined by formula:

$$w_{dist}(x, w_{time}) = \begin{cases} 0, x < x_1 \\ w_{time}, x_1 \le x \le x_2 \\ 0, x > x_2 \end{cases} \quad \text{(Equation 8)}$$

$x_1$ and $x_2$ are data fields of toll tag RCD entry

1.1.2.6 Sample Walk-Through of Real-Time Component of S(x,t)

FIG. 4 illustrates a sample layout of RCD for Real-Time Component of S(x,t). RCD positions are represented as relative distance marks in miles and are placed on the x-axis in FIG. 4. Values of weight function $w_{rcd_i}(x,t)$ for each RCD are placed on the y-axis. A roadway segment spans an interval between 0.25 mi and 5.75 mi. A real-Time Component of S(x,t) contains three RCD: probe, toll-tag and sensor. The sequence of probe RCD is not included for the sake of simplicity, but would be represented similarly to toll-tag RCD. For every position on the x-axis (i.e., slice), Real-Time component will attempt to compute value S(x,t). If there is at least one active RCD at this position (slices between 1.25 mi and 1.50 mi, 4.00 mi and 5.25 mi in FIG. 4), value S(x,t) would be computed via weighted sum of active RCD' speed values. Values of $w_{rcd_i}(x,t)$ for each active RCD are used as weights. When no active RCD is available ($w_{rcd_i}(x,t)=0$ for every RCD from Real-Time Component) for some position on the x-axis, a request for S(x,t) at this position is forwarded to Incident Component. A slice between 0.25 mi and 0.50 mi in FIG. 4 illustrates the case when no active RCD is available and Incident Component needs to handle the request for S(x,t) at that position.

1.1.3 Modeling Historical Component of S(x,t)

A historical component contains two types of RCD: Historical and Speed Limit. A historical component is invoked when no RCD for real-time and incident components are available on a roadway segment at time t, position x. No time and distance weights are applied to historical speed data, since a historical component contain only one type: Historical or Speed Limit RCD, hence there is no need for a weighted sum computation described in Section 1.1.1.

Figure 3:
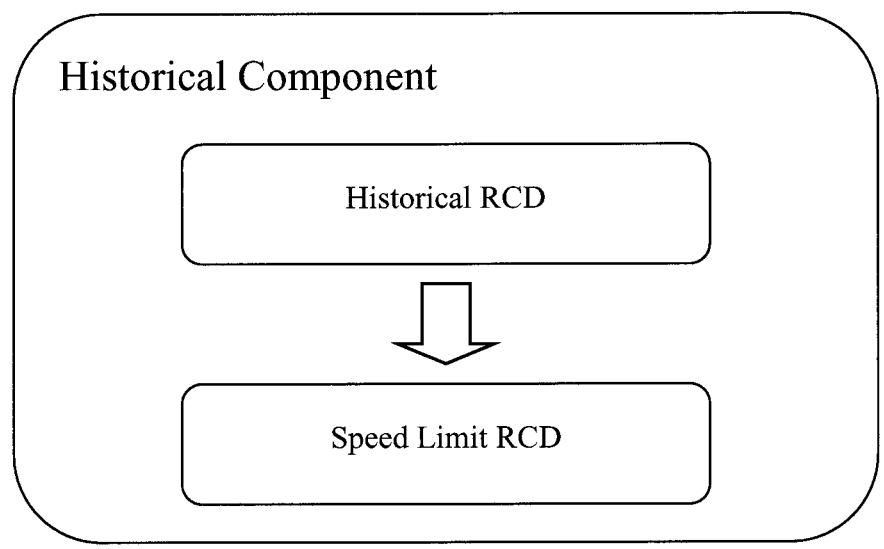

FIG. 3 illustrates the structure of a Historical component. Historical RCD takes precedence over Speed Limit RCD, and data from Speed Limit RCD is only used when Historical RCD is not available for the roadway segment at time t, position x.

Speed values for Historical RCD are assigned using data available from "NAVTEQ Traffic Patterns™ Database," commercially available from NAVTEQ, Chicago, Ill. Navteq Traffic Patterns provide average travel speeds for granular roadway segments (RDSTMC locations) for each day of the week as well as holidays. The data for this product is derived using sensor and GPS readings throughout the US, collected over the period of three years. When no Historical RCD is available, Speed Limit RCD is used to obtain the speed value. Speed values for Speed Limit RCD are assigned based on the speed limit for the roadway segment. Intuitively, Speed Limit RCD always report travel speeds of the free-flow traffic conditions (i.e., no congestion).

1.1.4 Modeling Incident Component of S(x,t)

Figure 2:
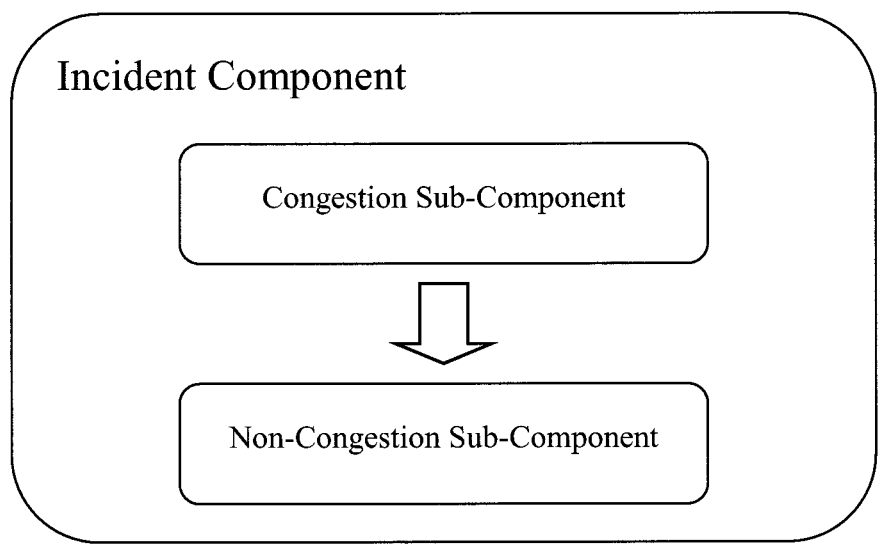

The Incident component is comprised of two sub-components: Congestion and Non-congestion (see FIG. 2). The Congestion sub-component operates on Congestion RCD entries. The Congestion RCD represent a congested segment of roadway which is manually identified by traffic operators.

A Non-congestion sub-component operates on Incident, Weather, Construction and Mass Transit RCD. RCD from a Non-congestion sub-component is used if, and only if, the Congestion sub-component contains no active Congestion RCD at position x and time t on the roadway segment.

The Congestion RCD entry may be created as a consequence of an RCD entry from the Non-congestion sub-component. Clustering of the Incident component into a Congestion and Non-congestion sub-component was a deliberate design choice, since it allows for Congestion RCD to take precedence over RCD from the Non-congestion sub-component. The Congestion RCD carries higher accuracy, since it was identified manually by traffic operators and therefore is considered confirmed to exist on the roadway segment.

An Instantaneous speed function S(x,t) for the Congestion and Non-Congestion sub-components of the Incident component are modeled as described in Section 1.1.1. Methods for modeling weight function $w_{rcd_i}(x,t)$ for the types of RCD from these sub-components are described below.

1.1.4.1 Assigning Speed Values for Congestion, Incident, Weather, Construction and Mass Transit RCDs Speed values for the corresponding RCD are assigned using special mappings which takes the following inputs: type of Event RCD (e.g., congestion, incident, weather, construction, mass transit), Event's criticality (manually assigned by traffic operators when the Event RCD is created), ratio between current historical speed (obtained from Historical RCD) and free-flow speed (obtained from Speed Limit RCD). The output of the mapping is the percentage that will be applied to current historical speed in order to obtain the speed value for the Event RCD. For instance, if the mapping outputs 70% and current historical speed is 40 mph, then the speed for the corresponding Even RCD would be set at 28 mph (40 mph× 70%).

For each metropolitan area, separate mappings are maintained. Initially, the mappings are constructed through statistical modeling using sets of prior Real-Time and Event RCD records collected over the period of three years. Historical speed data is obtained from Navteq Traffic Patterns product. In addition, each mapping is updated one quarterly basis using newly recorded data from Real-Time and Event RCD.

1.1.4.2 Modeling Time Weight Function for Congestion, Incident, Weather, Construction and Mass Transit RCDs To define a time weight function for congestion, incident, weather, construction and mass transit RCDs, let $t_0$ denote time when a RCD entry becomes active, $t_1$ denote time when a RCD becomes inactive, t denote time of roadway condition estimation, $w_{init}$ denote RCD's initial weight. A time weight function for these RCD is defined by formula:

$$w_{time}(t, w_{init}) = \begin{cases} 0, & t < t_0 \\ w_{init}, & t_0 \leq t \leq t_1 \\ 0, & t > t_1 \end{cases} \quad \text{(Equation 9)}$$

In the implementation of the system, the above parameters were set as follows:

$w_{init}$=1.0, for congestion RCD
$w_{init}$=1.0, for incident RCD
$w_{init}$=1.0, for weather RCD
$w_{init}$=1.0, for construction RCD
$w_{init}$=1.0, for mass transit RCD
$t_0$ and $t_1$ are data fields supplied by the Event RCD.

1.1.4.3 Modeling Position Weight Function for Congestion RCD

To define a position weight function for congestion RCD, let $x_1$ denote position where congestion event starts, $x_2$ denote position where congestion event ends, x is position of the congestion RCD weight calculation, $w_{time}$ is time weight for the RCD (i.e., initial weight for distance weight function). The weight function for congestion RCD is defined by formula:

$$w_{dist}(x, w_{time}) = \begin{cases} 0, & x < x_1 \\ w_{time}, & x_1 \leq x \leq x_2 \\ 0, & x > x_2 \end{cases} \quad \text{(Equation 10)}$$

$x_1$ and $x_2$ are data fields supplied by the congestion RCD.

1.1.4.4 Modeling Position Weight Function for Incident RCD

To define a position weight function for incident RCD, let $x_0$ denote position where incident event occurred, $d_{max}$ denote distance to which incident event extends upstream relative to the traffic flow (negative direction), x is position of the incident RCD weight calculation, $w_{time}$ is time weight for the RCD (i.e., initial weight for distance weight function). The weight function for incident RCD is defined by formula:

$$w_{dist}(x, w_{time}) = \begin{cases} 0, & x < x_0 - d_{max} \\ w_{time} \cdot \left(1 - \dfrac{x_0 - x}{d_{max}}\right), \\ 0, & x > x_0 \end{cases} \quad \text{(Equation 11)}$$

$$x_0 - d_{max} \leq x \leq x_0$$

$x_0$ and $d_{max}$ are data fields supplied by the incident RCD.

1.1.4.5 Modeling Position Weight Function for Weather, Construction and Mass Transit RCDs To define a position weight function for weather, construction and mass transit RCDs, let $x_1$ denote position where the event starts, $x_2$ denote position where the event ends, x is position of the event RCD weight calculation, $w_{time}$ is time weight for the event RCD (i.e., initial weight for distance weight function). The weight function for the event RCD is defined by formula:

$$w_{dist}(x, w_{time}) = \begin{cases} 0, & x < x_1 \\ w_{time}, & x_1 \leq x \leq x_2 \\ 0, & x > x_2 \end{cases} \quad \text{(Equation 12)}$$

$x_1$ and $x_2$ are data fields supplied by the event RCD.

1.1.4.6 Sample Walk-Through of Incident Component of S(x, t)

FIGS. 5 and 6 illustrate sample layouts of RCD for Congestion and Non-Congestion Sub-Components of Incident Component of S(x,t) respectively. RCD positions are represented as relative distance marks in miles and are placed on the x-axis in FIGS. 5 and 6. Values of weight function $w_{rcd_i}(x,t)$ for each RCD are placed on the y-axis. The roadway segment spans interval between 0.25 mi and 5.75 mi.

1.1.4.6.1 Congestion Sub-Component

The Congestion Sub-Component of S(x,t) contains only one congestion RCD. The Congestion Sub-Component may contain by design only one type of RCD: congestion, but it is possible for some slice to have multiple active congestion RCD entries. As a result, a weighted sum of speed values still applies when computing S(x,t). FIG. 5 shows a slice between 1.25 mi and 4.00 mi that contains one active Congestion RCD, which enables a congestion sub-component to produce a value (via weighted sum) of S(x,t) for that position. A slice between 0.25 and 1.25 in FIG. 5 illustrates a position where no active RCD is present in the Congestion Sub-Component ($w_{rcd_i}(x,t)=0$ for each RCD), and the Non-Congestion Sub-Component is requested to produce a value of S(x,t) at this position.

1.1.4.6.2 Non-Congestion Sub-Component

The Non-Congestion Sub-Component of S(x,t) contains two RCD entries (incident and weather) for the sake simplicity. Other types of RCD from Non-Congestion Sub-Component are modeled in a similar manner. FIG. 6 shows a slice between 3.15 mi and 3.75 mi that contains two active RCD entries. Value of S(x,t) at that position is computed via weighted sum of speed values obtained from incident and weather RCD, where $w_{rcd_i}(x,t)$ values at the position are used as weights. A slice between 0.25 and 1.75 in FIG. 6 illustrates a position where no active RCD is present in the Non-Congestion Sub-Component ($w_{rcd_i}(x,t)=0$ for each RCD), and a request for S(x,t) value at that position is forwarded to the Historical Component.

2. Method for Computing Quality Factor for Roadway Condition Estimation

Similarly to the method for estimating roadway condition, a roadway segment is defined by $x_{start}$ and $X_{stop}$ positions in terms of distance from a pre-defined beginning of the roadway, which the roadway segment belongs to. Intuitively, quality factor is an average of quality weight function across segment ($x_{start}, x_{stop}$) and calculated at time t. The formula for computing quality factor for roadway condition estimation is discreetly defined and has a form:

$$QF(x_{start}, x_{stop}, t) = \frac{\sum_{j=1}^{n} w_{qf}\left(x_{start} + \frac{x_{stop} - x_{start}}{n-1} \cdot (j-1), t\right)}{n} \quad \text{(Equation 13)}$$

where $w_{qf}(x,t)$ is the quality weight function which is defined below, n is number of segment iterations (i.e., subdivisions of segment defined by $x_{start}$ and $x_{stop}$ positions). Since a numerical approximation method is used in the calculation of estimating roadway condition on a roadway segment, the calculation of $QF(x_{start}, x_{stop}, t)$ may be integrated with the process of numerical integration. As a result, parameter n is controlled by the number of iteration steps used in numerical integration process, which depends on the segment's length but may range between 20 and 50 iterations per segment.

2.1 Modeling Quality Weight Function $w_{qf}(x,t)$

Analogously to instantaneous speed function S(x,t), the quality weight function $w_{qf}(x,t)$ has a hierarchical structure of three components: Real-Time, Incident (comprised of two sub-components) and Historical components. FIG. 1 shows a hierarchy of the components in descending order by its superiority at estimating the time of travel. Road condition data for higher level components would supersede RCD for lower level components. Whenever RCD is not available for a higher level component, RCD from a lower level would be used in the process of calculating values of the quality weight function $w_{qf}(x,t)$.

2.1.1 Modeling Components of $w_{qf}(x,t)$

To define quality the weight function $w_{qf}(x,t)$ for a component that needs to handle multiple RCD instances on a roadway segment (Real-Time and Incident components), let {active_rcd} denote a set of active RCD on roadway segment ($x_{start}, x_{stop}$) from the same component, $rcd_i$ denotes one RCD from set {active_rcd}, and $wq_{rcd_i}(x,t)$ denotes quality weight function for $rcd_i$ at position x and time t; then $w_{qf}(x,t)$ is defined as follows:

$$w_{qf}(x, t) = \max_{rcd_i \in \{active\_rcd\}} \{wq_{rcd_i}(x, t)\} \quad \text{(Equation 14)}$$

Modeling the quality weight function $w_{qf}(x,t)$ for these components is now reduced to modeling the quality weight function $wq_{rcd_i}(x,t)$ for each type of RCD that belong to these components. Intuitively, the quality weight function $w_{rcd}(x,t)$ captures the effect of each RCD on the quality of roadway condition estimation on a roadway segment ($x_{start}, x_{stop}$). The quality weight function $wq_{rcd_i}(x,t)$ is defined as following:

$$wq_{rcd_i}(x,t) = \max(wq_{dist}(x, wq_{time}(t, wq_{init})), wq_{min}) \quad \text{(Equation 15)}$$

$wq_{init}$ denotes an initial quality weight parameter assigned for type of $rcd_i$, $wq_{time}(t, wq_{init})$ is time quality weight function for type of $rcd_i$, $wq_{dist}(x, wq_{time}(t, wq_{init}))$ is position quality weight function for type of $rcd_i$ (time quality weight function $wq_{time}(t, wq_{init})$ becomes initial weight for distance quality weight function), $wq_{min}$ controls minimum possible value of quality weight function $wq_{rcd_i}(x,t)$.

The time quality weight function $wq_{time}$ and position quality weight function $wq_{dist}$ are not the same as time and position weight functions $w_{time}$ and $w_{dist}$ defined in Section 1.1.1 for the process of estimating roadway condition on a roadway segment. This is deliberately done to allow for more flexibility in tuning of the technique.

2.1.2 Modeling Real-Time Component of $w_{qf}(x,t)$

The Real-Time component of quality weight function $w_{qf}(x,t)$ is modeled as described in Section 2.1.1. Methods for modeling time and position quality weight functions $wq_{time}$ and $wq_{dist}$ for the types of RCD from Real-Time component are described in sections below. In the implementation of the system, a minimum quality weight value $wq_{min}$ for Real-Time Component was set to $wq_{min}=0.75$.

2.1.2.1 Modeling Time Quality Weight Function for Sensor, Probe, Sequence of Probes, Toll Tag RCDs To define the time quality weight function for sensor, probe, sequence of probes, toll tag RCDs, let $t_0$ denote time of RCD reading, t denote time of roadway condition estimation, then $t-t_0$ is RCD age; $t_{lifetime}$ is maximum age for one RCD reading, and $wq_{init}$ is RCD's initial quality weight. The time quality weight function for RCD is defined by formula:

$$w_{dist}(x, w_{time}) = \begin{cases} 0, t < t_0 \\ wq_{init} \cdot \left(1 - \frac{t - t_0}{t_{lifetime}}\right), \\ 0, t > t_0 + t_{lifetime} \end{cases} \quad \text{(Equation 16)}$$

$t_0 \leq t \leq t_0 + t_{lifetime}$

In the implementation of the system, the above parameters were set as follows:
$wq_{init}=1.0$, for sensor RCD
$wq_{init}=0.9$, for probe RCD
$wq_{init}=0.9$, for sequence of probes RCD
$wq_{init}=0.95$, for toll tag RCD
$t_{lifetime}=10$ minutes, for sensor, probe, sequence of probes and toll tag RCD
$t_0$ is data field of real-time RCD entry

2.1.2.2 Modeling Position Quality Weight Function for Sensor RCD

To define the position quality weight function for sensor RCD, let $x_0$ denote position of the sensor, $d_p$ and $d_n$ denote distances from $x_0$ to previous and next sensors relative to direction of the roadway correspondingly, x is position of the sensor RCD quality weight calculation, $wq_{time}$ is time quality weight for the sensor RCD (i.e., initial weight for position quality weight function), $d_{max}$ is maximum active distance for sensor RCD. Position quality weight function for sensor RCD is defined by formula:

$$wq_{dist}(x, wq_{time}) = \begin{cases} 0, x < x_0 - \min\left(d_{max}, \frac{d_p}{2}\right) \\ wq_{time} \cdot \left(1 - \frac{|x_0 - x|}{d_{max}}\right), \\ 0, x > x_0 + \min\left(d_{max}, \frac{d_n}{2}\right) \end{cases} \quad \text{(Equation 17)}$$

$$x_0 - \min\left(d_{max}, \frac{d_p}{2}\right) \le x \le x_0 + \min\left(d_{max}, \frac{d_n}{2}\right)$$

In the implementation of the system, the above parameters were set as follows:
$d_{max}$=2.0 miles
$x_0$, $d_p$ and $d_n$ are data fields of sensor RCD entry

2.1.2.3 Modeling Position Quality Weight Function for Probe RCD

To define the position quality weight function for probe RCD, let $x_0$ denote position of the probe, x is position of the probe RCD quality weight calculation, $wq_{time}$ is time quality weight for the probe RCD (i.e., initial weight for position quality weight function), $d_{max}$ is maximum active distance for probe RCD. The position quality weight function for probe RCD is defined by formula:

$$wq_{dist}(x, wq_{time}) = \begin{cases} 0, x < x_0 - d_{max} \\ wq_{time} \cdot \left(1 - \frac{|x_0 - x|}{d_{max}}\right), \\ 0, x < x_0 + d_{max} \end{cases} \quad \text{(Equation 18)}$$

$$x_0 - d_{max} \le x \le x_0 + d_{max}$$

In the implementation of the system, the above parameters were set as follows:
$d_{max}$=0.5 miles
$x_0$ is data field of probe RCD entry

2.1.2.4 Modeling Position Quality Weight Function for Sequence of Probes RCD To define the position quality weight function for a sequence of probes RCD, let $x_1$ denote position of the first probe RCD, $x_2$ denote position of the second probe RCD, x is position of the sequence of probes RCD quality weight calculation, $wq_{time}$ is time quality weight for the RCD (i.e., initial weight for position quality weight function). The position quality weight function for probe RCD is defined by formula:

$$wq_{dist}(x, wq_{time}) = \begin{cases} 0, x < x_1 \\ wq_{time}, x_1 \le x \le x_2 \\ 0, x > x_2 \end{cases} \quad \text{(Equation 19)}$$

$x_1$ and $x_2$ are data fields of sequence of probes RCD entry

2.1.2.5 Modeling Position Quality Weight Function for Toll Tag RCD

To define the position quality weight function for toll tag RCD, let $x_1$ denote position of the first toll tag reader (start), $x_2$ denote position of the second toll tag reader (end), x is position of the toll tag RCD quality weight calculation, $wq_{time}$ is time quality weight for the RCD (i.e., initial weight for position quality weight function). The position quality weight function for probe RCD is defined by formula:

$$wq_{dist}(x, wq_{time}) = \begin{cases} 0, x < x_1 \\ wq_{time}, x_1 \le x \le x_2 \\ 0, x > x_2 \end{cases} \quad \text{(Equation 20)}$$

$x_1$ and $x_2$ are data fields of toll tag RCD entry

2.1.2.6 Sample Walk-Through of Real-Time Component of $w_{qf}(x,t)$

FIG. 7 illustrates a sample layout of the RCD for Real-Time Component of $w_{qf}(x,t)$. RCD positions are represented as relative distance marks in miles and are placed on the x-axis in FIG. 7. Values of quality weight function $wq_{rcd_i}(x,t)$ for each RCD are placed on the y-axis. Roadway segment spans interval between 0.25 mi and 5.75 mi. Real-Time Component of $w_{qf}(x,t)$ contains three RCD: probe, toll-tag and sensor. The sequence of probe RCD is not included for the sake of simplicity, but would be modeled similarly to toll-tag RCD. For every position on the x-axis (i.e., slice), the Real-Time component will attempt to compute value $w_{qf}(x,t)$. If there is at least one active RCD at this position (slices between 1.25 mi and 1.50 mi, 2.50 mi and 4.00 mi in FIG. 7), maximum value of quality weights $wq_{rcd_i}(x,t)$ for each active RCD is assigned as quality weight $w_{qf}(x,t)$ for that position. When no active RCD is available ($wq_{rcd_i}(x,t)$=0 for every RCD from Real-Time Component) for some position on x-axis, request for $w_{qf}(x,t)$ at this position is forwarded to Incident Component. The slice between 0.25 mi and 0.50 mi in FIG. 7 illustrates the case when no active RCD is available and the Incident Component needs to handle the request for $w_{qf}(x,t)$ at that position.

2.1.3 Modeling Historical Component of $w_{qf}(x,t)$

Data from the Historical Component is used when no RCD for real-time and incident components available on a roadway segment at time t, position x. Quality weight function $w_{qf}(x,t)$ for historical component has scalar form. For Historical RCD $w_{qf}(x,t)$=0.7, and when no data from Historical RCD is available, data from Speed Limit RCD is used, and the quality weight function is defined as $w_{qf}(x,t)$=0.5.

2.1.4 Modeling Incident Component of $w_{qf}(x,t)$

The Incident component of quality weight function $w_{qf}(x,t)$ is comprised of two sub-components: Congestion and Non-congestion (see FIG. 2). Congestion sub-component operates on Congestion RCD entries. Congestion RCD represent a congested segment of roadway which is manually identified by traffic operators. Non-congestion sub-component operates on Incident, Weather, Construction and Mass Transit RCD. RCD from Non-congestion sub-component is used if, and only if, Congestion sub-component contains no active Congestion RCD at position x and time t on the roadway segment. The Quality weight function $w_{qf}(x,t)$ for Congestion and Non-Congestion sub-components of the Incident component are modeled as described in Section 2.1.1. Methods for modeling weight function $wq_{rcd_i}(x,t)$ for the types of RCD from these sub-components are described below. In the implementation of the system, a minimum quality weight value $wq_{min}$ for Incident Component was set to $wq_{min}$=0.7.

2.1.4.1 Modeling Time Quality Weight Function for Congestion, Incident, Weather, Construction and Mass Transit RCDs To define the time quality weight function for congestion, incident, weather, construction and mass transit RCDs, let $t_0$ denote time when event RCD entry becomes active, $t_1$ denote time when event RCD becomes inactive, and $wq_{init}$ is event RCD's initial quality weight. The time quality weight function for event RCD is defined by formula:

$$w_{time}(t, w_{init}) = \begin{cases} 0, & t < t_0 \\ w_{init}, & t_0 \leq t \leq t_1 \\ 0, & t > t_1 \end{cases} \quad \text{(Equation 21)}$$

In the implementation of the system, the above parameters were set as follows:
$wq_{init}=0.8$, for congestion RCD
$wq_{init}=0.75$, for incident RCD
$wq_{init}=0.75$, for weather RCD
$wq_{init}=0.75$, for construction RCD
$wq_{init}=0.75$, for mass transit RCD
Note that $t_0$ and $t_1$ are data fields supplied by the Event RCD.

2.1.4.2 Modeling Position Quality Weight Function for Congestion, Incident, Weather, Construction and Mass Transit RCDs To define the position quality weight function for congestion, incident, weather, construction and mass transit RCDs, let $x_1$ denote position where even RCD starts, $x_2$ denote position where event RCD ends, x is position of event RCD quality weight calculation, $wq_{time}$ is time quality weight for the event RCD (i.e., initial weight for position quality weight function). The position quality weight function for event RCD is defined by formula:

$$wq_{dist}(x, wq_{time}) = \begin{cases} 0, & x < x_1 \\ wq_{time}, & x_1 \leq x \leq x_2 \\ 0, & x > x_2 \end{cases} \quad \text{(Equation 22)}$$

Note, $x_1$ and $x_2$ are data fields supplied by the event RCD.

2.1.4.3 Sample Walk-Through of Incident Component of $w_{qf}(x,t)$

FIGS. 8 and 9 illustrate sample layouts of RCD for Congestion and Non-Congestion Sub-Components of Incident Component of $w_{qf}(x,t)$ respectively. RCD positions are represented as relative distance marks in miles and are placed on the x-axis in FIGS. 8 and 9. Values of quality weight function $wq_{rcd_i}(x,t)$ for each RCD are placed on the y-axis. The roadway segment spans interval between 0.25 mi and 5.75 mi.

2.1.4.3.1 Congestion Sub-Component

The Congestion Sub-Component of $w_{qf}(x,t)$ contains only one congestion RCD. The Congestion Sub-Component may contain by design only one type of RCD: congestion, but it is possible for some slice to have multiple active congestion RCD entries. FIG. 8 shows a slice between 1.25 mi and 4.00 mi that contains one active RCD, which enables congestion sub-component to produce value $w_{qf}(x,t)$ for that position. The slice between 0.25 and 1.25 in FIG. 8 illustrates a position where no active RCD is present in the Congestion Sub-Component ($wq_{rcd_i}(x,t)=0$ for each RCD), and the Non-Congestion Sub-Component is requested to produce value of $w_{qf}(x,t)$ at this position.

2.1.4.3.2 Non-Congestion Sub-Component

The Non-Congestion Sub-Component of $w_{qf}(x,t)$ contains two RCD entries (incident and weather) for the sake of simplicity. Other types of RCD from Non-Congestion Sub-Component are modeled in a similar manner. FIG. 9 shows a slice between 3.15 mi and 3.75 mi that contains two active RCD entries. Value of $w_{qf}(x,t)$ at that position is maximum quality weight $wq_{rcd_i}(x,t)$ for each active RCD in that component. The slice between 0.25 and 1.75 in FIG. 9 illustrates a position where no active RCD is present in the Non-Congestion Sub-Component ($wq_{rcd_i}(x,t)=0$ for each RCD), and request for $w_{qf}(x,t)$ value at that position is forwarded to the Historical Component.

Figure 10:
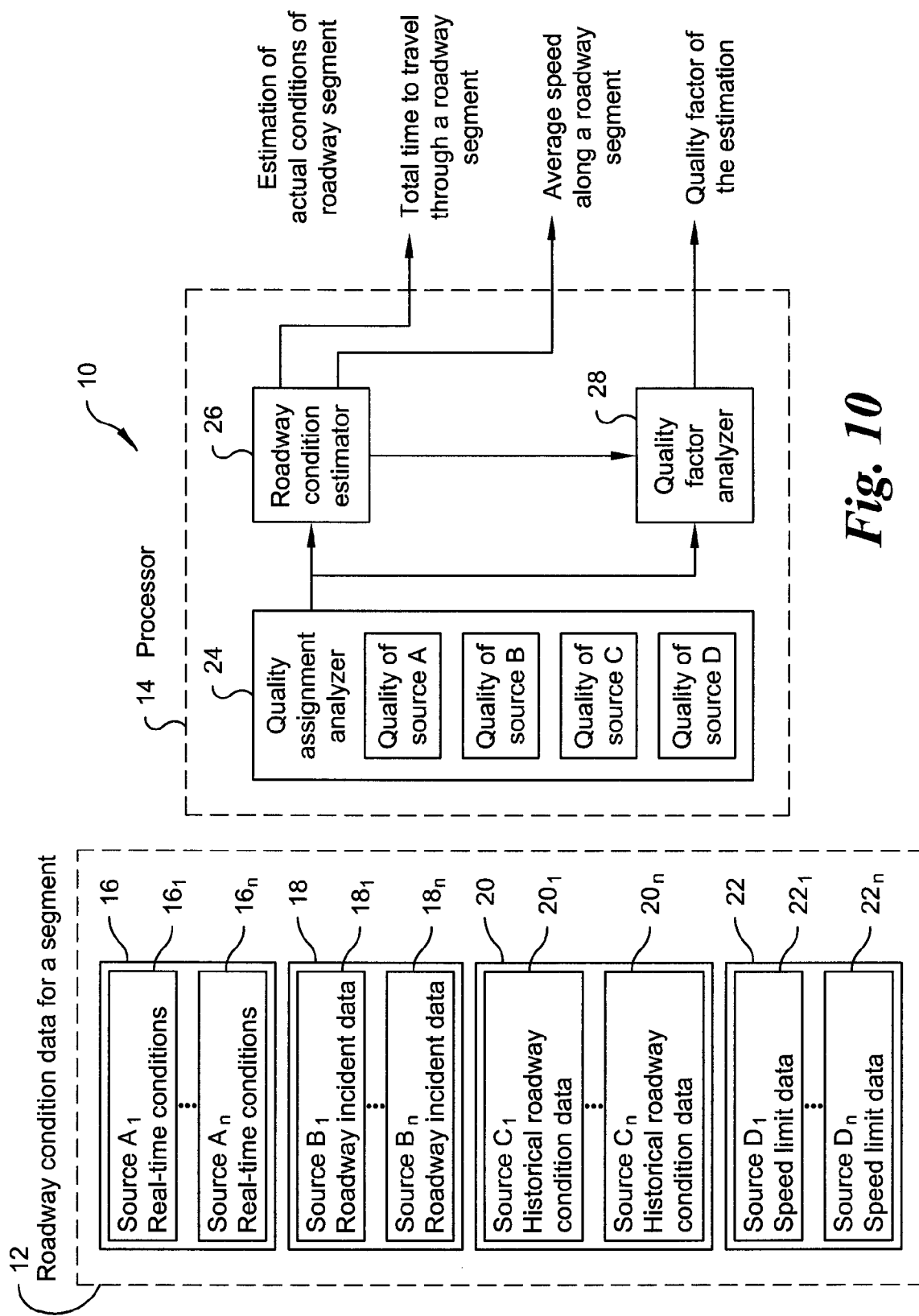
FIG. 10 shows a schematic block diagram of an apparatus for implementing one preferred embodiment.

FIG. 10 shows a schematic block diagram of an apparatus 10 for implementing one preferred embodiment of the present system. As described above, roadway condition data 12 for a segment is received by a processor 14 which outputs an estimation of actual conditions of the roadway segment, including total travel time through the roadway segment and average speed along the roadway segment, as well as a quality factor of the estimation. The roadway condition data 12 is obtained from a plurality of different types of sources of roadway condition data. Four different types of sources A-D, labeled as 16, 18, 20 and 22 are shown in FIG. 10. There may be one or more sources for each type of source, indicated in FIG. 10 as sources $16_1$-$16_n$, $18_1$-$18_n$, $20_1$-$20_n$ and $22_1$-$22_n$. The processor 14 assigns a quality to each of the sources 16-22 in a quality assignment analyzer 24, which is used by a roadway condition estimator 26 and quality factor analyzer 28 to obtain the desired outputs. The processor 14 implements the various algorithms described above. The processor may be any general-purpose computer.

Referring again to FIGS. 4-6, values of weight functions that are used in estimation of the actual roadway conditions are marked on the y-axis. These weight functions return weight values for each RCD that the weight function is associated with, given position x and time t. These weight values are used in weighted sum of speed values (each RCD carries a speed value reading) that produces an aggregated speed value at position x, time t.

Referring again to FIGS. 7-9, quality weight functions are placed on the y-axis. Quality weight functions are used in a quality factor calculation for the corresponding process of the estimation of the actual roadway conditions. Given position x and time t, a quality weight function for each RCD will return a quality weight value at position x, time t. The highest value of quality weight functions at position x, time t will be used as the quality weight at position x, time t. Then, the quality weight values at each position are aggregated to produce a final quality weight factor.

The HTTM described above provides at least the following advantages:

1. It allows for the use of multiple readings obtained from various types of sources of roadway condition data (e.g., sensors, toll-tags, probes) to produce estimated time of travel for an arbitrary segment of the road. More specifically, spatial information is used for each source of roadway conditions, thereby allowing multiple readings from multiple sources to be used to produce the final estimation of the travel time for some segment of the roadway. In addition to spatial information, the age and type of the readings is also used.

2. Each roadway is treated as a continuous segment. All of the sources of roadway condition data are placed at their actual locations on the roadway (in terms of mile marks from the beginning of the roadway). Travel time estimations may then be produced for any arbitrary interval on each modeled roadway.

3. Various types of roadway condition data sources are organized into a hierarchical schema. Real-time sources (e.g., sensors, toll-tags, probes) take precedence over all other types. Incident-based sources (e.g., manually entered data) will be used when no real-time sources are available. Finally, historical data source is used when no real-time and incident-based sources are present.

4. The quality factor is designed to indicate the quality of the travel time estimation using a set of available sources of roadway condition data, instead of using just a single source, thereby leading to a more accurate result in many instances.

The present system and method may be implemented with any combination of hardware and software. If implemented as a computer-implemented apparatus, the system is implemented using means for performing all of the steps and functions described above.

Embodiments of the present system and method can be included in an article of manufacture (e.g., one or more computer program products) having, for instance, computer useable media. The media has embodied (encoded) therein, for instance, computer readable program code means for providing and facilitating the mechanisms of the presently disclosed system and method. The article of manufacture can be included as part of a computer system or sold separately.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A computer-implemented method of estimating actual conditions of a roadway segment embodied on a non-transitory computer readable medium, the method comprising:
   providing roadway condition data to a processor for a plurality of data points along the roadway segment from a plurality of different sources of the roadway condition data, wherein the plurality of different sources are organized by source types, wherein a hierarchy defines which type of source is used for estimating actual conditions when data from the type of source is available, and wherein the hierarchy has an order of (i) real-time data, (ii) incident data, and (iii) historical data;
   assigning a weight function to each source of the real-time data and the incident data, wherein the weight function is based on quality of the data provided by the source; and
   estimating in the processor the actual conditions for each of the data points of the roadway segment by using the roadway condition data from only the type of source defined by the hierarchy, wherein if the real-time data or the incident data are used to estimate the actual conditions, the processor calculates a weighted sum of the roadway condition data using the assigned weight functions.

2. The method of claim 1, wherein the roadway condition data includes spatial information for each of the different types of sources, the spatial information being used in the step of estimating the actual conditions.

3. The method of claim 1, wherein the actual conditions include total time to travel through the roadway segment.

4. The method of claim 1, wherein the actual conditions include average speed along the roadway segment.

5. The method of claim 1, wherein each weight function has its own profile that varies over distance along the roadway segment.

6. The method of claim 1, wherein if the historical data is used to estimate the actual conditions, the processor uses traffic pattern data.

7. The method of claim 1, wherein if the historical data is used to estimate the actual conditions, the processor uses speed limit data.

8. The method of claim 1, wherein sources of the real-time data include roadway sensors, toll tag readers, and floating car probe data.

9. The method of claim 1, wherein sources of the incident data include accident data, event data, weather data, construction data, mass transit data and congestion data.

10. The method of claim 1, wherein sources of the historical data include traffic pattern data and speed limit data.

11. A computer-implemented method of estimating actual conditions of a roadway segment embodied on a non-transitory computer readable medium, the method comprising:
    receiving road condition data for a plurality of data points along the roadway segment, wherein the road condition data is classified as real-time data, incident data, or historical data;
    determining a source of the road condition data;
    if the road condition data is classified as real-time data or incident data, obtaining a predetermined weight function for the source of the roadway condition data, wherein the predetermined weight function is based on quality of the data provided by the source;
    estimating actual conditions for each of the data points along the roadway segment using a single classification of road condition data in an availability order of real-time data, incident data, and historical data, wherein if the real-time data is available then the actual conditions are estimated by calculating a weighted sum of the real-time data using the predetermined weight function for the source of the real-time data.

12. The method of claim 11, wherein sources of the real-time data include roadway sensors, toll tag readers, and floating car probe data.

13. The method of claim 11, wherein if the real-time data is not available and the incident data is available, the actual conditions are estimated by calculating a weighted sum of the incident data using the predetermined weight function for the source of the incident data.

14. The method of claim 13, wherein the incident data is sub-classified as congestion data and non-congestion data.

15. The method of claim 14, wherein the non-congestion data includes incident data, weather data, construction data, and mass transit data.

16. The method of claim 14, wherein the non-congestion data is used in the estimation of actual conditions only if the congestion data is not available.

17. The method of claim 13, wherein if the incident data is not available and the historical data is available, the actual conditions are estimated using the historical data.

18. The method of claim 17, wherein the historical data is sub-classified as traffic pattern data and speed limit data.

19. The method of claim 18, wherein the speed limit data is used in the estimation of actual conditions only if the traffic pattern data is not available.

20. A computer-implemented method of estimating actual conditions of a roadway segment embodied on a non-transitory computer readable medium, the method comprising:
    receiving roadway condition data, wherein the roadway condition data includes data from multiple data sources, wherein the data sources are organized by source types including at least one of real-time data, incident data, and historic data;
    selecting a single type of roadway condition data in a hierarchical manner such that the real-time data is selected if available, the incident data is selected if available and the real-time data is not available, and the historical data is selected if the real-time and the incident data are not available;

if the real-time data or the incident data is selected, obtaining a weight function for each source of the real-time data or the incident data, wherein the weight function is based on quality of the data provided by the source;

if the weight function is obtained, calculating a speed function using the weight function otherwise using the historic data as the speed function;

calculating a travel time for traveling through a roadway segment using the speed function; and outputting an estimation of actual conditions of the roadway segment based on the calculated travel time.

* * * * *